US005688125A

United States Patent [19]

Birdsong-Raffo

[11] Patent Number: 5,688,125

[45] Date of Patent: Nov. 18, 1997

[54] SYSTEM AND METHOD FOR SELECTING FABRICS

[76] Inventor: Jennifer Birdsong-Raffo, 3466 SE. Cassell La., Stuart, Fla. 34997

[21] Appl. No.: 421,885

[22] Filed: Apr. 14, 1995

[51] Int. Cl.[6] .............................. G09B 25/00; G09B 7/00

[52] U.S. Cl. ................................ 434/72; 434/75; 434/323

[58] Field of Search ............................... 434/72–110, 395

[56] References Cited

U.S. PATENT DOCUMENTS

| | | | |
|---|---|---|---|
| 2,121,246 | 6/1938 | Gordon | 35/50 |
| 2,317,673 | 4/1943 | Craig | 35/55 |
| 2,795,059 | 6/1957 | Mendelsohn | 35/53 |
| 3,135,058 | 6/1964 | Haas et al. | 35/53 |
| 3,430,364 | 3/1969 | Kirschbaum et al. | 35/49 |
| 4,458,435 | 7/1984 | Ackerman | 40/530 |
| 4,744,378 | 5/1988 | Bostic | 132/88.5 |
| 4,791,743 | 12/1988 | Kleinke | 40/322 |
| 4,931,929 | 6/1990 | Sherman | 364/401 |
| 4,992,050 | 2/1991 | Edwards | 434/98 |
| 4,998,882 | 3/1991 | Glover | 434/98 |
| 5,135,401 | 8/1992 | Feldman-Schorrig | 434/395 |
| 5,252,071 | 10/1993 | Hansard | 434/75 |
| 5,311,293 | 5/1994 | MacFarlane et al. | 356/421 |

OTHER PUBLICATIONS

Isabel B. Wingate, Textile Fabrics and Their Selection 5th ed., pp. 461, 548–552, 1964.

Standard Color Card of America, The Textile Color Card Association of the U.S.A. 4th ed., 1919.

Tate, Edwards, The Fashion Handbook, 2nd ed., pp. 45–47, 32–33, 1991.

Jennings, Paint & Colour Mixing, 5th ed., pp. 210–217, 1915.

*Primary Examiner*—Richard J. Apley
*Assistant Examiner*—John Edmund Roynak
*Attorney, Agent, or Firm*—Foley & Lardner

[57] ABSTRACT

A method and system for selecting a group of coordinated fabrics is provided. The system consists of a display member, which displays characteristics of the selected fabrics. Markers or a computer processing unit are used to record the characteristics of the selected fabrics. When the recorded characteristics of the selected fabrics are arranged in a predetermined manner, the selected fabrics are coordinated. Once the selected fabrics have coordinated, they may be used for decorating an area, such as a room in a house.

32 Claims, 8 Drawing Sheets

FIG. 7

82 84 14 24

| INDEX OF CHARACTERISTICS<br>CATEGORY : SUBCATEGORY | PREDETERMINED PATTERN OF CHARACTERISTICS |
|---|---|
| COLOR : COLORS OF "ANCHOR" FABRIC | AT LEAST ONE COMMON COLOR FROM THE COLORS OF "ANCHOR" FABRIC |
| STYLE : LOOSE<br>TIGHT | ALL LOOSE OR ALL TIGHT |
| LINE QUALITY : STRAIGHT<br>CURVED | 2 STRAIGHT & 1 CURVED<br>OR<br>2 CURVED & 1 STRAIGHT |
| APPEARANCE : SHINY<br>DULL | 2 SHINY & 1 DULL<br>OR<br>2 DULL & 1 SHINY |
| TEXTURE : ROUGH<br>SMOOTH | 2 ROUGH & 1 SMOOTH<br>OR<br>2 SMOOTH & 1 ROUGH |
| PATTERN SCALE : SMALL<br>MEDIUM<br>LARGE | 1 OF EACH |
| SHADING : LIGHT<br>MEDIUM<br>DARK | 1 OF EACH |

*FIG. 8*

14 100 102

| INDEX / FABRIC | FABRIC 1 | FABRIC 2 | FABRIC 3 |
|---|---|---|---|
| COLOR | RED GREEN BLUE | | |
| STYLE | TIGHT | | |
| LINE QUALITY | CURVED | | |
| APPEARANCE | DULL | | |
| TEXTURE | SMOOTH | | |
| PATTERN SCALE | LARGE | | |
| SHADING | MEDIUM | | |

35 90 34

92 94 96 98

FIG. 9

| INDEX / FABRIC | FABRIC 1 | FABRIC 2 | FABRIC 3 |
|---|---|---|---|
| COLOR | RED GREEN BLUE | RED GREEN BLUE | |
| STYLE | TIGHT | TIGHT | |
| LINE QUALITY | CURVED | STRAIGHT OR CURVED | |
| APPEARANCE | DULL | SHINY OR DULL | |
| TEXTURE | SMOOTH | ROUGH OR SMOOTH | |
| PATTERN SCALE | LARGE | SMALL OR MEDIUM | |
| SHADING | MEDIUM | LIGHT OR DARK | |

35 104 106 34 108 110 94 96a 98

FIG. 10

| INDEX / FABRIC | FABRIC 1 | FABRIC 2 | FABRIC 3 |
|---|---|---|---|
| COLOR | RED GREEN BLUE | BLUE | BLUE |
| STYLE | TIGHT | TIGHT | TIGHT |
| LINE QUALITY | CURVED | STRAIGHT | CURVED OR STRAIGHT |
| APPEARANCE | DULL | DULL | SHINY |
| TEXTURE | SMOOTH | ROUGH | ROUGH OR SMOOTH |
| PATTERN SCALE | LARGE | SMALL | MEDIUM |
| SHADING | MEDIUM | LIGHT | DARK |

35, 34, 94, 96b, 98a

SYSTEM AND METHOD FOR SELECTING FABRICS

BACKGROUND OF THE INVENTION

1. Field of the Invention

This invention relates to a system and a method for selecting coordinated fabrics. More particularly, the invention provides a fabric selection system for selecting at least three coordinated fabrics.

2. Related Art

Various systems have been suggested for selecting fabrics. Each system provides various fabrics to be selected, however, none of the present devices provide a system and method for coordinating the fabrics.

U.S. Pat. No. 2,317,673 to Craig shows a color correlating fabric sample book. The book is provided with two separate four ring binders. The binders hold different pieces of fabric. By changing the sheets of fabric like sheets in a looseleaf notebook, the user can align selected fabrics in order to compare and contrast the fabrics to choose a desired set of fabrics. The device of Craig, however, does not provide a systematic method for selecting the fabrics. Thus, the user must independently decide if the fabrics are coordinated.

U.S. Pat. No. 2,121,246 to Gordon shows a fabric sample book. The sample book is provided with a plurality of samples that are arranged next to one another. The fabric sample book only shows the different fabrics in an organized pattern next to one another and does not provide a system for choosing coordinated fabrics.

U.S. Pat. No. 4,458,435 to Ackerman shows a fabric display booklet with removable material swatches. The booklet of Ackerman, similar to the display booklets of Craig and Gordon, fails to teach or suggest a display system and method of selecting coordinated fabrics.

SUMMARY OF THE INVENTION

One of the objectives of the present invention is to provide a fabric selection system that can be used to coordinate fabrics. The fabric selection system is provided with a support member having a display surface. The display surface of the fabric selection system is provided with an index of fabric characteristics. The system uses a means for recording to record the characteristics of the selected fabrics.

In a first embodiment of the invention, the means for recording the selected characteristic comprises a plurality of markers used on the display surface to indicate various characteristics of each of the selected fabrics. In a second embodiment of the invention, the means for recording comprises a computer processing unit.

Another objective of the invention is to provide a fabric selection system which may be readily transported. This objective of the invention is achieved by providing a fabric selection system with a support member having a plurality of panel members. The panel members of the support member are connected by a flexible member such that they may be folded into a stack and readily transported. This objective is further achieved by using a hand-held computer.

An additional objective of the invention is to provide a realistic set of characteristics in the index of fabric characteristics to assist in selecting the various coordinated fabrics. The characteristics listed in the index of fabrics may be selected from the following list of characteristics: color, style, appearance, line quality, texture, pattern scale, and shading. Each of the characteristics may be further broken down into subcharacteristics such that the appropriate characteristics of the selected fabric may be properly selected.

A further objective of the invention is to provide a user with a means for recording the characteristics of the selected fabric. This is achieved by having a plurality of markers for use on the display surface to indicate the various characteristics of the selected fabric. The markers comprise a set of indicia to indicate the selected characteristics. The indicia may be wording which describes the characteristics or, a marking, such as a symbol, pattern, color or combination thereof, which can indicate the selected characteristic.

Another objective of the invention is to provide a uniform and organized method on the display surface for selecting the coordinated fabrics. This objective is achieved by providing a grid on the display surface. The index of characteristics is provided in a column or a row on the grid, and the remaining space on the grid is provided with characteristic labels on which the means for recording the various characteristics of the selected fabric are placed.

Another objective of the invention is to provide an organized and systematic selection process for choosing the coordinated fabrics. This objective is achieved by comparing a predetermined pattern for the characteristics with the recorded characteristics.

A further objective of the invention is to provide an automated device for carrying out the invention. The automated device may comprise a computer, preferably hand held, with a computer display screen for displaying the fabric characteristics. The computer is provided with a computer housing and a computer input device, such as a keyboard, for entering the characteristics of the selected fabrics. A means for recording, such as a computer processing unit, records the characteristics entered from the computer input device. The means for recording assists the user in selecting the coordinated fabrics by comparing the various entered characteristics with a predetermined pattern of fabric characteristics. In a further embodiment of the invention, the automated device selects fabrics from a predetermined group of fabrics stored in a computer processing unit.

The system and method according to the invention that provides the objectives as stated above will become apparent from the detailed description given hereinafter. It should be understood, however, that the detailed description, while indicating a preferred embodiment of the invention, is given by way of illustration only since various changes and modification within the spirit and scope of the invention will become apparent to those skilled in the art.

BRIEF DESCRIPTION OF THE DRAWINGS

FIG. 7 shows a chart illustrating one embodiment of the predetermined fabric characteristics for the index of characteristics used in the present invention;

FIGS. 8–10 show a computer screen of the second embodiment during different stages of the fabric selection method shown in FIG. 6.

DETAILED DESCRIPTION OF THE PREFERRED EMBODIMENTS

Figure 1:
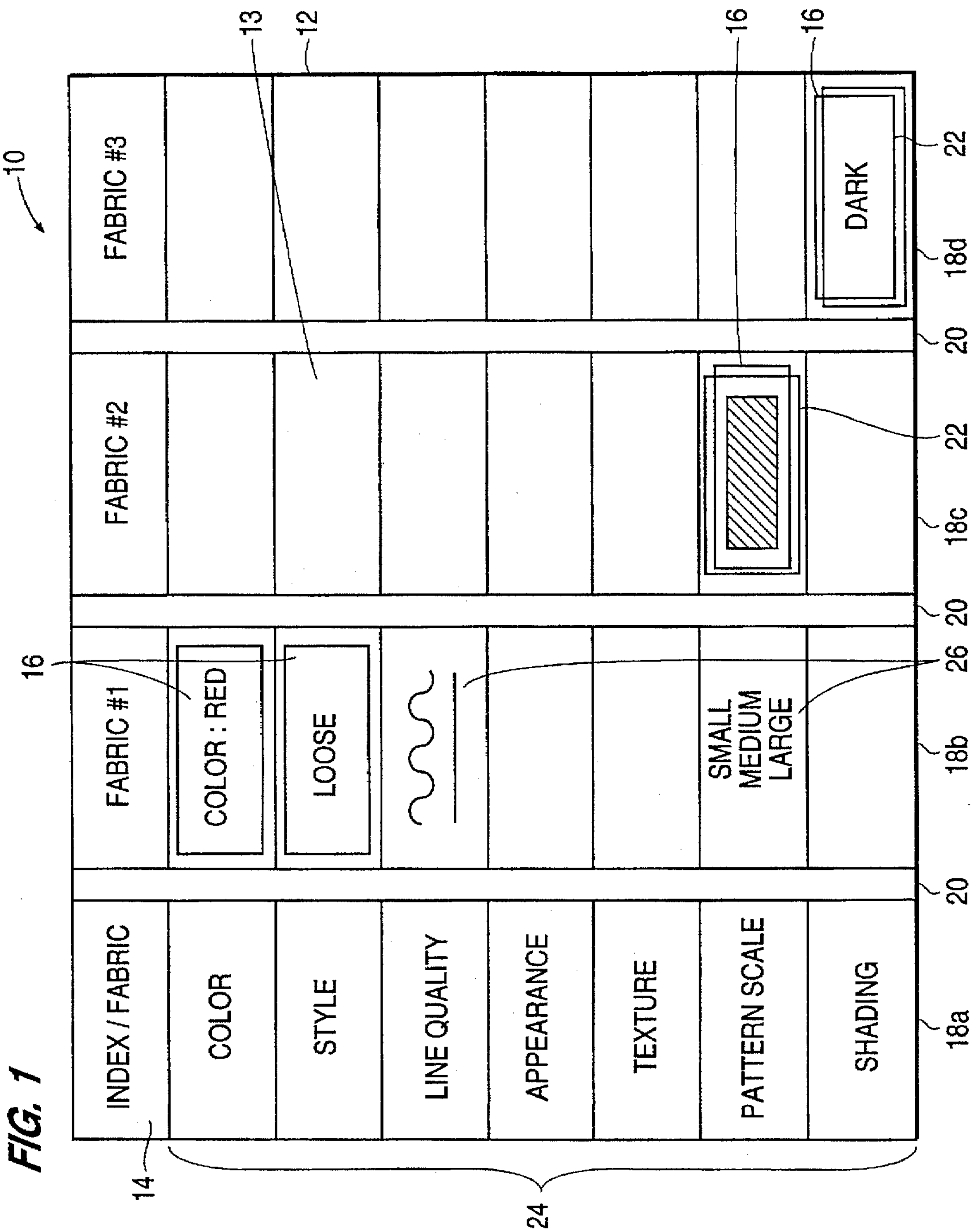
FIG. 1 shows a front view of a first embodiment of the fabric selection system of the present invention.

FIG. 1 shows a first embodiment of the fabric selection system 10 of the present invention. The fabric selection system 10 consists of a support member 12 which has a front display surface 13. The front display surface 13 is provided with a index of fabric characteristics 14. Disposed along the face of the front display surface 13 are columns and rows which indicate the various fabrics to be selected.

Figure 2:
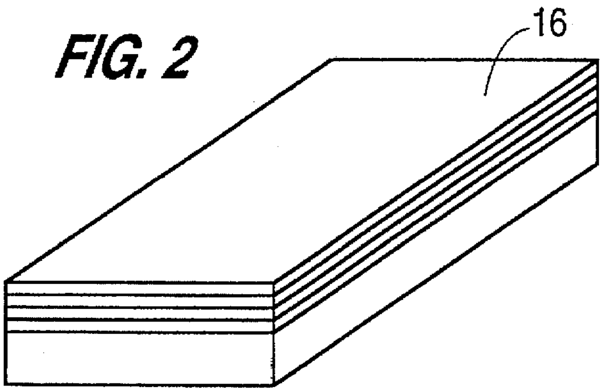
FIG. 2 shows a perspective view of the means for recording used with the first embodiment of the invention shown in FIG. 1.

FIG. 2 shows a means for recording the characteristics of the selected fabrics. In this embodiment the means for recording comprises a plurality of markers in the form of a set of cards 16, for use on the display surface 13. The cards 16 are provided with indicators that correspond to the categories listed in the index of fabric characteristics. Although the plurality of markers are shown as a set of cards 16, it is to be understood that any device such as colored beads, poker chips, colored pens, etc., could be used as long as they are able to indicate the various fabric characteristics.

The index of fabric characteristics 14 is provided with various categories and subcategories 24. The breakdown of the categories and subcategories is shown in FIG. 7 and is described below.

The front display surface 13 is provided with characteristic labels 26 which correspond to the various categories listed in the index of characteristics. The characteristic labels 26 comprise a further part of the means for recording in the first embodiment. As shown in FIG. 1, the characteristic labels may be wording, shapes such as symbols to indicate the characteristics, a color selected to indicate the subcategories of the characteristics, and/or a combination of any of the above.

On the display surface 13, pockets 22 can be provided for holding the plurality of markers 16 in place to indicate the selected characteristics of each of the fabrics. The pockets 22 can be made of a clear material so that each card can be easily seen.

Figure 3:
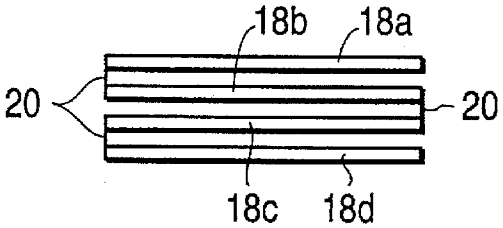
FIG. 3 shows the fabric selection system of FIG. 1 in a folded and stacked manner.

The support member 12 of the fabric selection system may be a single panel member. As shown in FIGS. 1 and 3, however, in the first preferred embodiment, the fabric selection system 10 is provided with four panel members 18*a*–18*d*. The panel members are connected by a flexible connection member 20 such that the four panel members 18*a*–18*d* may be folded and stacked upon one another. This stacked arrangement will allow the fabric selection system to be readily transported.

The panel members of the fabric selection system may be made of any material suitable for displaying the index of characteristics and the characteristic labels. In the preferred embodiment shown in FIG. 1, the panel members 18*a*–18*d* are cardboard. Preferably, as shown in FIG. 1, the index of characteristics is provided on one panel member 18*a* and the characteristic labels for each of the fabrics (1–3) to be selected are provided on a separate panel member 18*b*–18*d*, respectively.

The flexible connection members 20 employed between each of the panel members may be any device which allows the panel members 18*a*–18*d* to be folded and stacked upon one another. In the preferred embodiment shown in FIG. 3, the flexible connecting members are plastic.

Figure 4:
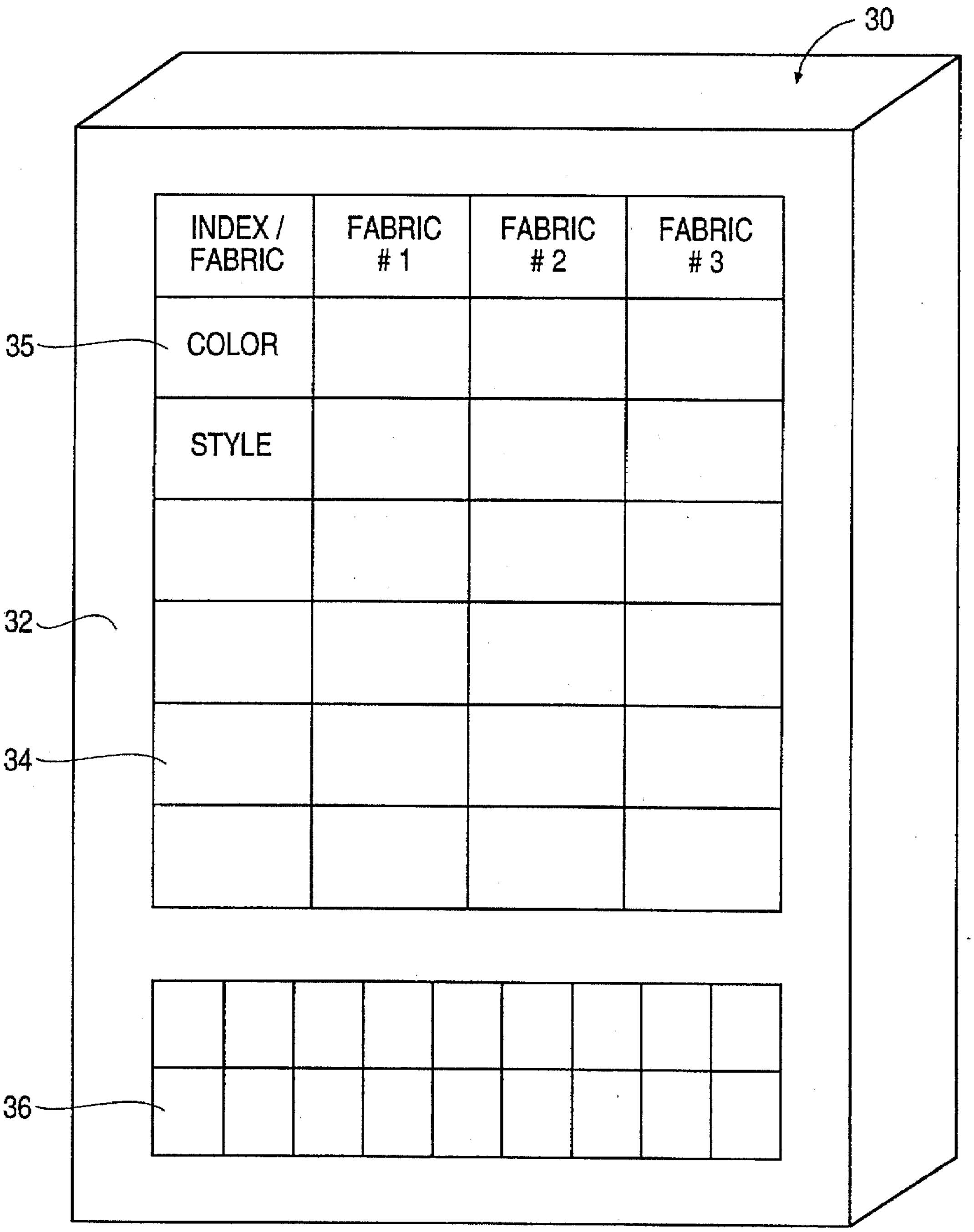
FIG. 4 shows a second embodiment of the fabric selection system.

FIG. 4 shows a second preferred embodiment of the invention. The second preferred embodiment of the invention is an automated system which employs a computer. The computer fabric selection system 30 is provided with a computer housing 32 and a display screen 34. In the preferred embodiment shown in FIG. 4, the computer housing 32 is sized to be hand held. However, it should be understood, that the computer housing 32 may be a standard size personal computer, and wherein the display screen 34 constitutes the monitor used with the personal computer.

The computer fabric selection system 30 is provided with an input device 36. In the preferred embodiment shown in FIG. 4, the input device 36 constitutes a keyboard for inputting the information regarding the characteristics of the various selected fabrics.

Figure 5:
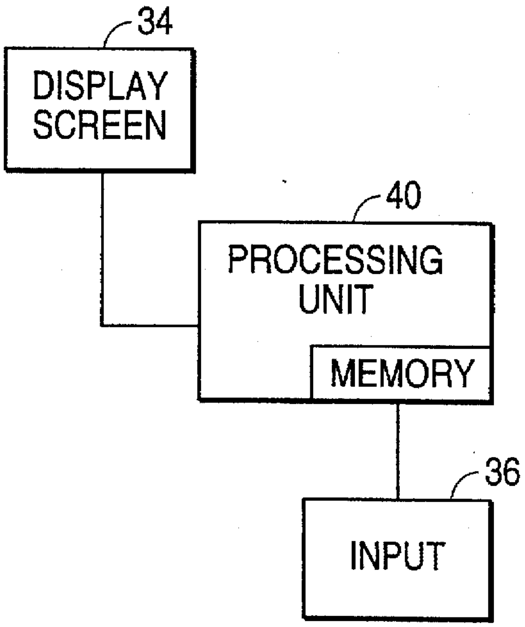
FIG. 5 shows a block diagram of the second embodiment of the fabric selection system.

FIG. 5 shows a block diagram of the invention shown in FIG. 4. The display screen 34 of the computer fabric selection system is operatively connected to a means for recording the characteristics of the selected fabrics. In this embodiment, the means for recording comprises a processing unit 40 provided with a memory unit. The processing unit 40 receives data from the input device 36. The input device 36 may either be the keyboard, as discussed above, or any appropriate arrangement such as a bar code system or a voice activated arrangement, as long as the device allows the user to enter information into the processing unit 40.

The computer screen 34 of the computer fabric selection system 30 may be provided with a grid 35 to use the fabric selection method of the present invention. The grid 35 illustrated in FIG. 4 is provided with an index of fabric characteristics 14 as shown in FIGS. 1 and 7. The index of characteristics could be provided in a column or a row of the grid. The remaining area on the grid would be used for indicating the characteristic of each of the selected fabrics.

Alternatively, the computer screen 34 may be provided with a single column or row which lists the index of characteristics. The user would use this list to enter the characteristics of the selected fabrics in accordance with the method discussed below. In this embodiment, the processing unit 40 would prompt the user to enter the current fabric (first, second, or third) that is being analyzed, and would further direct the user by way of the computer screen 34 to enter the characteristics of the first and second fabrics.

Figure 6:
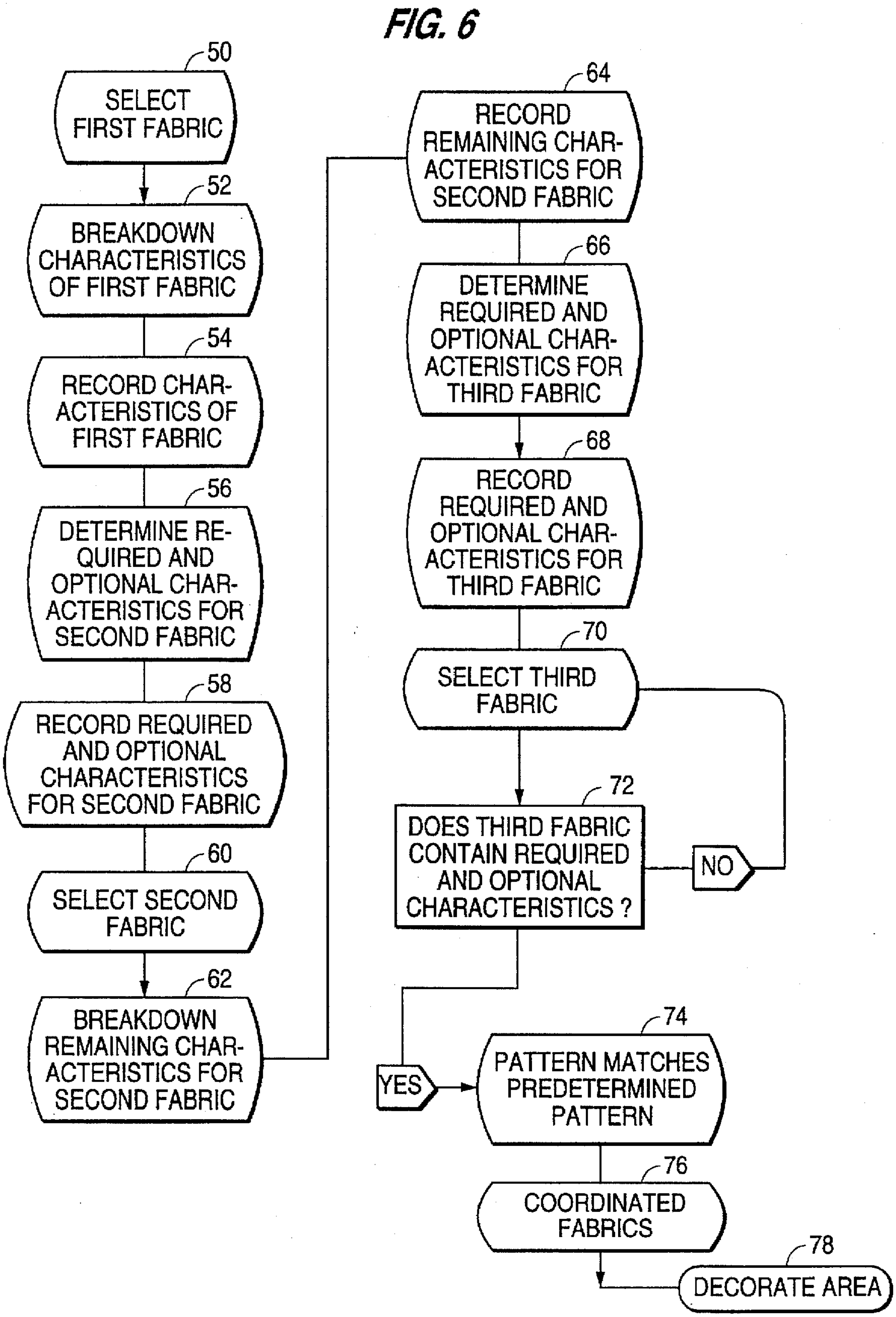
FIG. 6 shows a flow chart showing the steps used in carrying out the fabric selection method of the present invention.

FIG. 6 shows a flow chart for carrying out the method of the present invention. This method may be utilized with either the first or second embodiment of the invention. Although, in each embodiment the method steps will involve slightly different procedures.

In the method shown in FIG. 6, three coordinated fabrics are being selected. It should be understood, however, that with proper adjustment any number of fabrics may be selected with the system and method of the present invention. In order to increase the number of fabrics to be coordinated together, a user may simply increase the initial fabric selection steps and update the predetermined pattern chart shown in FIG. 7 as discussed below.

As shown in FIG. 7, the index of characteristics 14 is provided with categories and subcategories 24 for determining the characteristics of the fabrics. For example, the style category is broken into two subcategories, loose and tight. Tight connotating a fabric with a controlled pattern, and loose connotating a fabric with a freely constructed pattern. The other categories and subcategories listed in the index of characteristics in FIG. 7 are used to identify the characteristics of the selected fabrics. Although only seven categories with subcategories (Color: colors of the first fabric; Style: loose, tight; Line Quality: straight, curved; Appearance: shiny, dull; Texture: rough, smooth; Pattern Scale: small, medium, large; Shading: light, medium, dark) have been shown in FIG. 7, it is to be understood that the user may arrange and select any number of characteristics to coordinate the fabrics. However, in the preferred embodiment shown in FIG. 7, the characteristic categories illustrated are used to carry out the method of selecting three coordinated fabrics in accordance with the present invention.

In order to obtain a coordinated group of fabrics, the pattern of characteristics of the first, second, and third fabrics must match the predetermined pattern of characteristics 84 set forth in chart 82 of FIG. 7. Chart 82 is used as follows. First, an anchor fabric is chosen. This is the first of the three fabrics as will be discussed in greater detail below, the second and third fabrics are chosen based on the characteristics of the first fabric using the predetermined pattern of characteristics 84. As shown in chart 82 under the predetermined pattern of characteristics 84, at least one of the colors in the anchor fabric must be in both the second fabric and the third fabric, such that all the fabrics have a common color. Under the style category for each of the selected fabrics, all of the selected fabrics must either have a loose pattern or a tight pattern. Under the line quality category the fabrics selected must be chosen such that there are two straight fabrics and one curved fabric, or the reverse, two curved fabrics and one straight fabric. In the appearance category, the three coordinated fabrics must have either two shiny fabrics and one dull fabric, or the reverse, two dull fabrics and one shiny fabric. Furthermore, when the texture category is considered the fabrics must be selected such that there are two rough fabrics and one smooth fabric, or the reverse, two smooth fabrics and one rough fabric. When the pattern scale category is analyzed, there must be a fabric for each of the subcategories: small, medium, and large. Similarly, when the shading category is analyzed, there must be one fabric for each of the subcategories: light, medium, or dark.

When all of the characteristics of the three selected fabrics correspond to a pattern set forth in the predetermined pattern of characteristics, then the fabrics are coordinated and may be used for decorating an area.

Returning to FIG. 6, the initial step 50 of the method comprises selecting the first fabric which becomes the "anchor" or main fabric.

Once the first fabric has been selected, the fabric characteristics are broken down as shown by step 52. Breakdown of the fabrics consists of determining the various subcategories for each of the categories discussed above.

After the characteristics of the first fabric is broken down in the step 52, a user of the fabric selection system and method will record the characteristics of the first fabric in accordance with step 54.

When using the first embodiment of the invention, the user will use the plurality of markers, i.e. the set of cards 16, to record the characteristics. By placing these cards 16 on the display surface 13 in line with the appropriate category shown in the fabric selection system 10, the various characteristics of the first fabric will be recorded. For example, if the anchor fabric is a loose fabric, a card designating "LOOSE" is placed in the style row under "FABRIC #1"

After the characteristics of the first fabric are recorded in step 54, the characteristics which are required and optional for the second fabric are determined in step 56. In determining which characteristics are required for the second fabric the chart 82 shown in FIG. 7 is used. As discussed above, FIG. 7 shows in the predetermined pattern of characteristics 84 that all of the fabrics must have at least one common color which is the same as one of the colors of the "anchor" or first fabric. Moreover, the predetermined pattern of characteristics shows that all of the selected fabrics must have a similar style. That is all of the fabrics must have a loose or tight pattern. Thus, by selection of the first fabric, these two categories, color and style, have been determined and are required for the second fabric.

Furthermore, while the color and style categories have become required characteristics for the second fabric, the other remaining categories still provide optional characteristic categories for the second fabric. Although, the remaining categories provide optional characteristics for the second fabric, those options are limited in accordance with the predetermined pattern discussed above.

Specifically, under the pattern scale category each of the subcategories small, medium and large must be selected for the three different fabrics. Thus, once the first fabric is chosen, a user can determine which of the remaining subcategories are available options, for the second fabric. The same optional determination with regard to the pattern scale also applies to the shading category. That being, once the first fabric is chosen the shading options available for the second fabric are determined. For example, if the first fabric is light, the second fabric must be either medium or dark.

The other remaining categories, line quality, appearance, and texture, will also have options available for the second fabric. Under each of these categories either one of the possible subcategories, shown in FIG. 7, are still options available for the second fabric.

After the required and optional characteristics for the second fabric are determined, they may be recorded in a manner similar to how the characteristics of the first fabric in step 54 are recorded.

In the first embodiment of the invention, the user would use the cards 16 to record the characteristics required for the second fabric. For example, after the first fabric has been chosen and the style subcharacteristic has been determined, the user knows that the style characteristic for the second fabric must be the same. Thus, the user would place a card 16 in the appropriate location on the display surface 13 to indicate that the second fabric has a style the same as the first fabric. Moreover, because the second fabric must have at least one of the colors of the first fabric the user could indicate this required characteristic by placing the various color cards for the colors available in the color section under the second fabric column shown in the fabric selection system 10.

Furthermore, by sizing the cards such that more than one card can fit on the area provided for the characteristic label 26 of each of the subcategories, the user can show the optional characteristics available for the second fabric. For example, if the shading subcategory for the first fabric is light, the user may place a medium and a dark card on the characteristic label for shading under the second fabric to indicate the options available.

After the required and optional characteristics for the second fabric have been recorded in step 58, the user in step 60 selects a second fabric based on these required and optional characteristics. That is, the second fabric is selected such that it has at least one of the same colors of the first fabric, and is also the same style of the first fabric. Moreover, in choosing the second fabric the user must select the fabric such that the pattern scale and the shading of the fabric are of one of the options still remaining after the first fabric has been chosen. Specifically, for example, if the first fabric that was chosen had a small pattern scale and light shading, the user would select the second fabric such that it has a medium or large pattern scale and medium or dark shading. By recording the required and optional characteristics for the second fabric in step 58, the selection of the second fabric in step 60 is facilitated.

After the second fabric has been selected, the actual characteristics of the fabric, i.e. line quality, appearance, texture, scale pattern, and shading, are broken down in step 62 and recorded in step 64. In other words, the card, representing options not selected are removed from the "FABRIC #2" column, leaving only cards which characterize the selected fabric.

Once all the characteristics of the second fabric have been recorded in step 64, a determination of the characteristics that are required and optional for the third fabric is carried out in step 66. The determination for the third fabric in step 66 is similar to the determination for the second fabric carried out in step 54. However, at this point in the method, more of the characteristics will be required. That is, fewer options will be available.

After the second fabric has been selected and the remaining characteristics have been recorded in step 64, the determination of the characteristics in step 66 which are required and optional for the third fabric will assist the user in selecting the third fabric. In determining the characteristics that are required and optional for the third fabric, the predetermined pattern characteristic chart shown in chart 82 is used as follows. As discussed above, the third fabric must include a color which matches one of the common colors in the first and second fabrics. Thus, these colors may be shown on the area on the display surface 13 by using color cards to show the various colors available for the third fabric and will assist the user in selecting a coordinated third fabric. Additionally, the style of the third fabric has already been determined by the selection of the first fabric. That is, the third fabric must be either loose or tight to match the style characteristic of the first and second fabrics. Moving down the index of characteristics shown in FIG. 7 to the pattern scale or shading characteristics, once the first and second fabrics have been selected the pattern scale and shading required for the third fabric is known. For example, if the first fabric has a small pattern and the second fabric has a medium pattern, the third fabric is required to have a large pattern. Similarly, for example, in the shading category, if the first fabric is a light shade and the second fabric is of a medium shade, the third fabric must be a dark shade. Thus, the characteristics color, style, pattern scale and shading for the third fabric are known and required to achieve a coordinated group of fabrics.

The categories line quality, appearance, and texture may be required for the third fabric where the first and second fabrics contain the same subcategory under the selected characteristic. For example, if the line quality of the first and second fabrics is straight, the predetermined pattern of characteristics 84 indicates that the third fabric must be curved. Thus, the line quality of the third fabric becomes a required characteristic in the third fabric.

Alternatively, if the first fabric is straight and the second fabric is curved, the third fabric may be either straight or curved to obtain a match with the requirements of the predetermined pattern of characteristic 84 shown in chart 82. This type of determination also applies to the appearance and the texture categories. Thus, for these three categories, line quality, appearance, and texture, if the first and second fabrics have been chosen such that each represents one of the two available subcategories of characteristics, then the subcategory necessary for the third fabric is not required, but is optional.

After the required and optional characteristics for the third fabric are determined in step 66, they are recorded in step 68 in a similar manner as discussed above with regard to recording the characteristics of the second fabric in step 58.

The next step 70 in carrying out the method of the present invention is for the user to select a third fabric. The third fabric is selected based on the recorded required and optional characteristics for the third fabric. By having the required and optional characteristics recorded on the display surface, the user of the fabric selection system can readily select a third fabric to facilitate achieving a coordinated group of fabrics.

As indicated in FIG. 6, at the determining step 72, when the user selects the third fabric such that it includes all of the required and optional characteristic, the characteristic pattern of the first, second, and third fabrics will match one of the patterns in the predetermined pattern of fabric characteristic 84 as indicated in step 74, and thus the three fabrics are coordinated in step 76. Then the fabrics can be used in the next step 80 to decorate an area, such as a room.

The method of FIG. 6 discussed above in conjunction with the first embodiment of the invention can also be accomplished with the computer fabric selection system 30 of the second embodiment of the invention. When the method is carried out using the computer fabric selection system 30, the recording steps 54, 58, 64, 68, and the determining steps 56 and 66 are automatically performed by the processing unit 40. The processing unit 40 also assists the user in selecting the fabrics by displaying on the computer screen 34 the required and the optional characteristics that the fabrics must include to obtain a match in step 74 between the characteristics pattern of the three fabrics and predetermined pattern of characteristics 84 shown in FIG. 7. Moreover, the processing unit 40 can be configured to prompt the user to input the characteristics of the selected fabric in accordance with the method described above. By having this characteristic information and being prompted by the computer to enter information, the user can more readily carry out steps 60 and 70 of selecting the second and third fabrics.

To facilitate understanding how the computer fabric selection system 30 is used to carry out the method set forth in FIG. 6, FIGS. 8–10 have been provided. FIGS. 8–10 show the computer screen 34 of the computer fabric selection system 30 shown in FIG. 4. Each of the FIGS. 8–10 show the grid 35 at a different stage in the method and will be discussed below.

As shown in FIG. 8, grid 35 is provided with four columns 92–98 and eight horizontal columns 90. Column 92 displays the index of characteristics 14 in accordance with FIG. 7. The other remaining columns 94–98 provide an area for indicating the various characteristics of the appropriate fabric (1–3) in accordance with the method.

As discussed above, step 50 of the method comprises selecting the first fabric and step 52 comprises breaking down the characteristics of the selected fabric in accordance with FIG. 7.

After the characteristics of the first fabric have been broken down, the characteristics are recorded at step 54. When using the second embodiment of the invention, the user records the characteristics of the first fabric in a memory of the processing unit 40 by way of the input device 36 shown in FIG. 4. The computer fabric selection system 30, in addition to recording the characteristics in memory, displays the recorded characteristics on the computer screen 34.

FIG. 8 shows column 94 of the computer screen displaying the recorded characteristics of the first fabric. The characteristics used in FIG. 8 constitute a representative characteristic set for fabric 1 and are used only to facilitate understanding of the invention. These representative characteristics in no way limit the various combinations of characteristics that the selected fabric may have in accordance with the characteristics 14 shown in FIG. 7 and discussed above.

Moreover, when it is time for the user of the computer fabric selection system 30 to record the characteristics of the first fabric in step 54, a prompt command generated by the processing unit 40 may be displayed over the grid 35. For example, when the user indicates by way of the keyboard that they are ready to record the characteristics broken down in step 52, the computer will first prompt the user to indicate the colors of the first fabric. The prompt command generated by the processing unit 40 may be carried out by highlighting the box 100 on the grid 35 shown in FIG. 8. Alternatively, a window may appear over the grid 35 which directs the user to enter the colors of the first fabric.

Although only two prompt methods have been discussed, the computer processing unit 40 may be configured to prompt the user in any manner which will alert the user that the broken down characteristics of the selected fabric should be entered. For example, after the user has entered the colors of the first fabric in box 100 in accordance with the prompt command, the computer processing unit 40 may generate a audible sound to indicate to the user that the subcategory for the style characteristic of the fabric 1 should be entered in box 102. Moreover, the computer processing unit could be configured to have both a visual and audible prompt command.

After each of the characteristics of the first fabric have been recorded in step 54, the computer processing unit automatically determines the required and optional characteristics for the second fabric. Once the computer processing unit has determined the required and optional characteristics for the second fabric in step 56, the computer processing unit records the required and optional characteristics in a manner similar to how the processing unit 40 records the characteristics of the first fabric. That is, the computer processing unit 40 will record the required and optional characteristics of the second fabric in memory from the users prompted input responses, and display the characteristics on the computer grid 35.

FIG. 9 shows a representation of the computer screen 34 at this stage of the method. Specifically, column **96*a* of the grid 35, shown in FIG. 9, displays the required characteristics and the optional characteristics of the second fabric. Box 104 shows that at least one of the same colors of the first fabric shown in box 100 in FIG. 8 must be selected for the second fabric such that there is a common color between the two fabrics. Furthermore, box 106** shows that the style of the second fabric must be the same as the first fabric.

The boxes for the remaining categories in the index of characteristics, i.e. line quality, texture, pattern scale, shading, show the various options available for the second fabric. For example, in the illustrated example shown in FIG. 9, box 108 shows that the line quality of the fabric may be either straight or curved based on the characteristics of the first representative fabric selected and discussed above with regard to FIG. 8. Moreover, as discussed above with regard to carrying out the method in the first embodiment, box 110 shows that the options for the pattern scale of the second fabric are limited to small or medium based on the pattern scale (large) recorded for the first fabric in step 54.

After the required and optional characteristics have been recorded for the second fabric in accordance with step 58 and as discussed above, the user selects the second fabric in step 60 based on the display shown in FIG. 9. Once the second fabric has been selected in accordance with the displayed characteristics, the remaining characteristics which were optional are broken down in step 62 by the user. After the user breaks down the remaining characteristics for the second fabric, the user records these characteristics in a manner similar to how the characteristics for the first fabric were recorded.

In order to prevent the user from selecting a second fabric which is not in accordance with the displayed characteristics, the computer processing unit 40 may be configured such that the user cannot record a characteristic which is inconsistent with the predetermined pattern of FIG. 7. For example, if the user selected a second fabric when viewing FIG. 9 that had a large pattern scale, the computer processing unit would not allow the user to record this fabric. The processing unit 40 by way of the computer screen 34 would indicate to the user that the selected fabric is not consistent with the options available and a different second fabric must be selected.

After the user has input the characteristics of the second fabric and they are recorded in accordance with step 60, the computer processing unit will determine the required and optional characteristics for the third fabric in step 66. This determination is similar to the determination carried out for the second fabric in step 56. However, as discussed above in regard to carrying out the fabric selection method with the first embodiment, at this stage of the method, more of the categories will be required for the third fabric and will not be optional. Once the computer processing unit 40 has determined the required and optional characteristics for the third fabric, these characteristics are recorded in memory of the processing unit 40 and displayed on the grid 35 in step 68.

FIG. 10 shows a representative embodiment of computer screen 34 at step 68 used in the method of selecting three coordinating fabrics. Specifically, FIG. 10 in column 94 shows the characteristics of the first fabric recorded at step 54, column **96*b* shows the characteristics recorded for the second fabric at steps 58 and 64. It is to be understood the recorded characteristics in column 96*b* are only a representative second fabric, and as with the first fabric the representative fabric does not limit the method. Column 98*a* on grid 35 shows the required and optional characteristics for the third fabric based on the representative first and second fabrics in accordance with the predetermined pattern of characteristics 84. For example, column 98*a* shows that the characteristics for the categories color, style, appearance, pattern scale, and shading have now been determined and are considered required characteristics for the third fabric. At this stage, only the categories "line quality" and "texture" remain optional choices for the third fabric. Presented with the display of grid 35 in FIG. 10, the user may readily choose a third fabric in accordance with step 70. Moreover, because the line quality and texture categories in the representative embodiment shown in FIG. 10** are the only optional category remaining, the user effectively does not have to consider these categories when selecting the third fabric. Thus, the third fabric may be selected based on only the required characteristics discussed above.

When the user selects the third fabric in accordance with step 70, the user determines if the fabric contains all the required and optional characteristics in accordance with column **98*a* at step 72. If the selected third fabric does include all of the required and optional characteristics, the pattern of characteristics for the first, second, and third fabrics matches one of the predetermined characteristics patterns provided in the chart 82, and thus the fabrics are coordinated at step 76. Then the fabrics may be used to decorate an area in accordance with step 78**.

On the other hand, if the third fabric does not contain all the required and optional characteristics at step 72, the user returns to step 70 and continues to select third fabrics until the third fabric does contain all the required and optional characteristics displayed on the computer grid 35 in column 98*a*.

Thus, in accordance with the method of FIG. 6 and the second embodiment of the invention shown in FIGS. 4 and 5, the user with the assistance of the computer processing unit 40 may readily choose and select a group of three coordinated fabrics.

Alternatively, the method discussed above may be automated by using the computer fabric selection system 30 to select fabrics from a predetermined group of fabrics. For example, the characteristics of the fabrics in a fabric display book or room may be input into the processing unit such that when the first fabric is selected, the computer prompts the user by identifying all fabrics which have the characteristics require of the second fabric. The user makes a choice from the available options to select the second fabric, and the processing unit automatically identifies those fabrics which qualify as the third fabric and provides a coordinated group of fabrics in accordance with FIG. 7.

For example, the characteristics of the predetermined number of fabrics from the display book may be input into the processing unit 40 by the input device 36. The computer screen will then prompt the user to select a first fabric from the group of fabrics. For example, the fabrics in the display book or room could be coded with an indicator such as a number, a letter, and/or a bar code for the user to use as the selection indication to the processing unit. Thereafter, the user will select a second fabric from the group of remaining fabrics. The computer will only allow the user to choose a second fabric which corresponds with the first fabric in accordance with step 56 illustrated in FIG. 6.

After the first and second fabrics are selected, the computer processing unit will automatically select the third fabrics which will allow the pattern of the three selected fabrics to match the predetermined pattern of markers 84 set forth in FIG. 7. Moreover, if the processing unit 40 determines that the group of fabrics does not have a third fabric that will create a coordinated set of fabrics, it will inform the user of such, and ask the user to add more fabrics to the group of fabrics or try again by selecting a new first fabric or second fabric. Although more than one third coordinated fabric may be available from the group of fabrics, the computer will prompt the user to consider the different fabrics and choose the one most suitable for their personal preference.

It is to be understood, that any combination of coordinated fabrics may be chosen with the method as shown in FIG. 6. It is to be noted, that the selection of the coordinated fabrics may be initiated from any number of fabrics originally input into the processing unit. With repetitive use of the system, the processing unit can be arranged to store various fabrics by different categories such that a data bank of fabric characteristics will be arranged. For example, the processing unit can store the fabrics by any of the following categories: floral, striped, checkered, plaid or geometric patterns, and mini-prints, abstracts, solids, or specialty prints. By having the various characteristics for groups of fabrics in the different categories set forth above, a user of the computer fabric selection system 30 may automatically determine which category of patterns they want to select their first fabric from, and then the computer system can be used to automatically select their second and third fabrics to acquire a coordinated fabric selection.

After the coordinated fabrics have been selected, the first fabric is used as the main or "anchor" for decorating an area. The area to be decorated may be a room or any area in a house or a building. The "anchor" fabric becomes the base fabric for decorating the area.

It will be understood that various modifications in the form of the invention as described herein in its preferred embodies may be made without departing from the spirit thereof and the scope of the claims which follow.

What is claimed is:

1. A decorative fabric selection system, comprising:

a support member having a display surface;

a display of decorative fabric characteristics provided on the display surface, said decorative fabric characteristics including a plurality of distinctive decorative fabric characteristics for at least two decorative fabrics; and a means for recording said distinctive decorative fabric characteristics of a first decorative fabric of said at least two decorative fabrics to provide at least one determinative decorative fabric characteristic from a predetermined pattern of decorative fabric characteristics and determining at least one required decorative characteristic of a second decorative fabric of said at least two decorative fabrics from said at least one determinative decorative fabric characteristic.

2. The decorative fabric selection system of claim 1, wherein the means for recording comprises a plurality of markers, each of the markers indicating different decorative fabric characteristics of the distinctive decorative fabric characteristic on the display surface.

3. The decorative fabric selection system of claim 1, wherein the support member comprises a single panel.

4. The decorative fabric selection system of claim 1, wherein the support member comprises a plurality of panel members, each panel member having a surface which forms part of the display surface.

5. The decorative fabric selection system of claim 4, further comprising flexible connecting members and wherein the flexible connecting members join the plurality of panel members such that the plurality of panel members are stackable.

6. The decorative fabric selection system of claim 5, wherein the number of panel members is four and one of the four panel members displays the plurality of distinctive decorative fabric characteristics.

7. The decorative fabric selection system of claim 2, further comprising pockets on the display surface; wherein the pockets retain the plurality of markers to indicate the distinctive decorative fabric characteristic.

8. The decorative fabric selection system of claim 1, wherein the plurality of distinctive decorative fabric characteristics includes a listing of two or more of the following decorative characteristics: color, style, appearance, line quality, texture, pattern scale, and shading.

9. The decorative fabric selection system of claim 1, wherein the plurality of distinctive decorative fabric characteristics includes a listing of two or more of the following decorative characteristics: color, style, appearance, line quality, pattern scale, texture, and shading; and the listing is provided on the display surface in a line.

10. The fabric selection system of claim 9, wherein the plurality of distinctive decorative fabric characteristics is one of a column and a row.

11. The decorative fabric selection system of claim 1, further comprising a grid on the display surface; wherein the plurality of distinctive decorative fabric characteristics comprises one of a column and a row in the grid and a remaining area of the grid comprises a space for the means for recording for indicating the plurality of distinctive decorative fabric characteristics on the display surface.

12. The decorative fabric selection system of claim 11, further comprising decorative characteristic labels; wherein the decorative characteristic labels are provided in the space on the grid in one of columns and rows.

13. The decorative fabric selection system of claim 12, wherein the number of decorative characteristic labels corresponds to a number of decorative characteristics listed in the plurality of distinctive decorative fabric characteristics and a predetermined quantity of fabrics the system is arranged to select.

14. The decorative fabric selection system of claim 13, wherein the quantity of fabrics is three.

15. The decorative fabric selection system of claim 2, wherein the plurality of markers comprise a set of cards, and wherein each card in the set of cards has indicia which corresponds to a selected decorative fabric characteristic.

16. The decorative fabric selection system of claim 15, wherein the indicia is wording, a color, a symbol, or a combination thereof.

17. The decorative fabric selection system of claim 1, wherein the support member comprises a computer housing and the display surface comprises a computer screen; and wherein the means for recording comprises a processing unit.

18. The decorative fabric selection system of claim 17, wherein the processing unit records the distinctive decorative fabric characteristics of said first decorative fabric.

19. The decorative fabric selection system of claim 17, wherein the processing unit indicates the distinctive decorative characteristics of the first fabric on the computer screen.

20. The decorative fabric selection system of claim 17, further comprising a grid on the computer screen, and wherein the plurality of decorative fabric characteristics is arranged in one of a column and a row on the grid.

21. A method of selecting a group of coordinated decorative fabrics for decorating an area, comprising:

selecting a primary decorative fabric;

recording decorative fabric characteristics of the primary decorative fabric in relation to distinctive decorative fabric characteristics to provide at least one determinative decorative fabric characteristic from a predetermined pattern of decorative fabric characteristics;

selecting a secondary decorative fabric based on at least one required decorative characteristic of the secondary decorative fabric determined from the at least one determinative decorative fabric characteristic of the primary decorative fabric;

recording the same decorative fabric characteristics of the primary decorative fabric for the secondary decorative fabric in relation to the distinctive decorative fabric characteristics; and choosing a tertiary decorative fabric such that the same decorative fabric characteristics of the primary decorative fabric for the tertiary decorative fabric form the predetermined pattern with the recorded decorative fabric characteristics of the primary decorative fabric and the secondary decorative fabric.

22. The method of selecting a group of coordinated decorative fabrics of claim 21, further comprising:

using the primary fabric as the base fabric for decorating an area.

23. The method of selecting a group of coordinating fabrics of claim 21, wherein the step of recording the decorative characteristics of the primary decorative fabric includes entering the decorative characteristics of the primary decorative fabric into a memory of a computer processing unit and displaying the decorative characteristics on a computer screen.

24. The method of selecting a group of coordinating decorative fabrics of claim 21, wherein the step of recording the decorative characteristics of the secondary decorative fabric includes entering the decorative characteristics of the secondary decorative fabric into a memory of a computer processing unit and displaying the decorative characteristics on a computer screen.

25. The method of selecting a group of coordinating decorative fabrics of claim 21, wherein the step of selecting a secondary decorative fabric includes choosing the secondary decorative fabric with at least one of the following decorative characteristics comprising the required decorative characteristic: color, style, line quality, pattern scale, texture, and shading.

26. A method of selecting a group of coordinated decorative fabrics for decorating an area, comprising:

selecting a primary decorative fabric;

recording decorative fabric characteristics of the primary decorative fabric in relation to distinctive decorative fabric characteristics to provide at least one determinative decorative fabric characteristic from a predetermined pattern of decorative fabric characteristics;

selecting a secondary decorative fabric based on at least one required decorative characteristic of the secondary decorative fabric determined from the at least one determinative decorative fabric characteristic of the primary decorative fabric;

recording the same decorative fabric characteristics of the primary decorative fabric for the secondary decorative fabric in relation to the distinctive decorative fabric characteristics; and choosing a tertiary decorative fabric such that the same decorative fabric characteristics of the primary decorative fabric for the tertiary decorative fabric form the predetermined pattern with the recorded decorative fabric characteristics of the primary decorative fabric and the secondary decorative fabric;

wherein the step of selecting a tertiary decorative fabric includes choosing the tertiary decorative fabric in accordance with at least two of the following decorative characteristics of the primary and secondary decorative fabrics: color, style, line quality, pattern scale, texture, and shading; and wherein at least two of the decorative characteristics are required decorative characteristics for the tertiary decorative fabric determined from the predetermined pattern.

27. The decorative fabric selection system of claim 8, wherein said at least one determinative decorative characteristic comprises said color characteristic.

28. The decorative fabric selection system of claim 8, wherein said at least one determinative decorative characteristic comprises said color and said style characteristics.

29. A decorative fabric selection system, comprising:

a support member having a display surface;

a display of decorative fabric characteristics provided on the display surface, said decorative fabric characteristics including a plurality of distinctive decorative fabric characteristics for at least two decorative fabrics; and a means for recording said distinctive decorative fabric characteristics of a first decorative fabric of said at least two decorative fabrics to provide at least one determinative decorative fabric characteristic from a predetermined pattern of decorative fabric characteristics and determining at least one required decorative characteristic of a second decorative fabric of said at least two decorative fabrics from said at least one determinative decorative fabric characteristic;

wherein said at least two decorative fabrics comprise said first decorative fabric, said second decorative fabric, and a third decorative fabric;

wherein said means for recording and determining records said distinctive decorative characteristic of said second decorative fabric to provide at least one determinative decorative characteristic from said predetermined pattern of decorative fabric characteristics and determines at least one required decorative characteristic of said third decorative fabric from said at least one determinative decorative fabric characteristic of said second decorative fabric; and wherein said plurality of distinctive decorative fabric characteristics includes a listing of two or more of the following decorative characteristics: color, style, appearance, line quality, texture, pattern scale, and shading.

30. The decorative fabric selection system of claim 29, wherein said at least one determinative decorative characteristic comprises said color characteristic.

31. The decorative fabric selection system of claim 29, wherein said at least one determinative decorative characteristic comprises at least two of said color, style, appearance, line quality, texture, pattern scale, and shading characteristics.

32. The decorative fabric selection system of claim 31, wherein said at least one required decorative characteristic comprises said at least two determinative decorative characteristics.

* * * * *